United States Patent
Tart et al.

(10) Patent No.: US 7,452,169 B2
(45) Date of Patent: Nov. 18, 2008

(54) ROTARY CUTTING TOOL AND METHOD

(76) Inventors: Christopher E. Tart, 301 Tart Town Rd., Dunn, NC (US) 28334; John H. Raynor, Jr., 410 Goosehole Rd., Benson, NC (US) 27504

( * ) Notice: Subject to any disclaimer, the term of this patent is extended or adjusted under 35 U.S.C. 154(b) by 269 days.

(21) Appl. No.: 10/957,282

(22) Filed: Oct. 1, 2004

(65) Prior Publication Data

US 2005/0079023 A1     Apr. 14, 2005

Related U.S. Application Data

(60) Provisional application No. 60/509,635, filed on Oct. 8, 2003.

(51) Int. Cl.
*B23C 3/12* (2006.01)
(52) U.S. Cl. ............... 409/138; 409/180; 409/218; 144/144.1; 144/253.3
(58) Field of Classification Search ............ 409/180, 409/138, 181–182, 178–179, 210, 214, 218, 409/125, 130; 144/136.95, 154.5, 144.1, 144/253.3
See application file for complete search history.

(56) References Cited

U.S. PATENT DOCUMENTS

| | | | | |
|---|---|---|---|---|
| 1,459,534 | A | * | 6/1923 | Hilker ............... 144/253.1 |
| 3,289,717 | A | * | 12/1966 | Dutot ............... 144/134.1 |
| 3,360,023 | A | * | 12/1967 | Rutzebeck ........ 144/134.1 |
| 4,118,268 | A | | 10/1978 | Price |
| 4,669,923 | A | | 6/1987 | McKinney |
| 4,806,050 | A | | 2/1989 | Brynat |
| 4,844,135 | A | | 7/1989 | Witt |
| 4,960,352 | A | * | 10/1990 | Kishi ............... 409/180 |
| 5,044,843 | A | * | 9/1991 | Velepec ............ 409/218 |
| 5,116,166 | A | * | 5/1992 | Rinas .............. 409/180 |
| 5,352,072 | A | * | 10/1994 | Velepec ............ 144/253.3 |
| 5,647,700 | A | | 7/1997 | Velepec |
| 5,899,252 | A | | 5/1999 | Pozzo |

(Continued)

FOREIGN PATENT DOCUMENTS

JP    2-224910 A  *  9/1990

OTHER PUBLICATIONS

AP International web site for aptoolparts.com, "Laminate Trim Bits & Cutters." Avaialbe at http://www.aptoolparts.com/html/laminate_trim_cut.html.

*Primary Examiner*—Erica E Cadugan
(74) *Attorney, Agent, or Firm*—David P. Hendricks

(57) ABSTRACT

A rotary cutting tool and method for cutting a shape in a workpiece. The rotary cutting tool includes a shank portion, a cutting portion, a bearing connected to one end of the cutting portion, and a rub collar attached to the periphery of the bearing. The outer diameter of the rub collar is selected to be larger than the diameter of the cutting portion. The rotary cutting tool is used to cut a workpiece, such as decorative plastic laminate, to the approximate shape of the substrate, such as a counter top, to which it will be mounted. The larger diameter rub collar allows the workpiece to be cut larger than the dimensions of the substrate in order to reduce the level of skill and amount of labor required for the cutting operation and subsequent placement of the workpiece onto the substrate.

3 Claims, 5 Drawing Sheets

U.S. PATENT DOCUMENTS 6,048,142 A * 4/2000 Hashimoto et al. ..... 29/888.022
6,887,017 B2 * 5/2005 Klesser ....................... 407/53
6,926,477 B2 * 8/2005 Allemann et al. ........ 144/253.3

* cited by examiner

ROTARY CUTTING TOOL AND METHOD

CROSS-REFERENCE TO RELATED APPLICATIONS

The present application claims the benefit of U.S. Provisional Application No. 60/509,635 filed Oct. 8, 2003, entitled "Improved Rotary Cutting Tool and Method."

BACKGROUND

In the manufacture of items such as counter tops, tables, desks, shelves, and other furniture items, the base material is often wood or an engineered wood product such as particle board or plywood. Such base materials provide structural integrity, but may not provide an aesthetically appealing appearance. Consequently, the outer surfaces of these items are often covered with a thin decorative laminate that is glued to the surface. It is necessary to use a rotary cutting tool, or router bit, to cut the decorative laminate to the general shape of the surface being covered.

Rotary cutting tools used for cutting thin decorative laminate are well known. U.S. Pat. No. 5,647,700 describes a router bit with a ball bearing guide for trimming the overhanging edge of a plastic laminate. Similarly, U.S. Pat. No. 4,669,923 describes a ball bearing guided router bit for trimming the overhanging edge of a plastic laminate. Although rotary cutting tools are known in the art, these tools require a high level of skill and increase the amount of time necessary to cut the laminate to the general shape of the surface being covered. Consequently, there exists a need for an improved rotary cutting tool that will reduce the level of skill and amount of time necessary to cut a shape in a workpiece.

SUMMARY

The present invention is directed to an apparatus that satisfies the need for a rotary cutting tool with a bearing and rub collar for cutting a predetermined shape in a workpiece while reducing the level of skill and amount of time necessary to cut the predetermined shape. The preferred embodiment of the present invention comprises a rotary cutting tool having a shank portion and a cutting portion. The shank portion can be mounted in a device to rotate the cutting tool, such as a router. The shank portion and the cutting portion are mounted end-to-end such that they are coaxial with one another. Attached to the end of the cutting portion opposite the end where the shank portion is attached, is a bearing. The bearing is attached so that its axis of rotation is coaxial to the shank portion and the cutting portion. A rub collar is attached to the outer periphery of the bearing so that the rub collar is also coaxial to the shank portion and the cutting portion, and so that the bearing and the rub collar have a common center point. The rub collar has an outer diameter that is greater than 0.375 inch larger than the diameter of the cutting portion and no greater than 1.5 inches larger than the diameter of the cutting portion. Preferably, the rub collar has an outer diameter at least 0.5 inch larger than the diameter of the cutting portion and no greater than 1 inch larger than the diameter of the cutting portion.

Another embodiment of the present invention comprises the bearing and rub collar of the preferred embodiment.

The present invention also provides a method for cutting a workpiece into a predetermined shape using a rotary cutting tool. The method of the present invention includes the steps of providing a rotary cutting tool with a bearing and rub collar attached to one end of the cutting portion of the rotary cutting tool, retaining the shank portion of the rotary cutting tool in a device to rotate the rotary cutting tool, providing a substrate to which a workpiece will be mounted, providing a workpiece that is larger than the substrate, attaching the workpiece to the substrate so that the workpiece can later be removed, positioning the rotary cutting tool a predetermined distance from the side of the substrate, and moving the rotary cutting tool along each side of the substrate. The predetermined distance is determined by the diameter of the rub collar. The rub collar has an outer diameter that is greater than 0.375 inch larger than the diameter of the cutting portion and no greater than 1.5 inches larger than the diameter of the cutting portion. Preferably, the rub collar has an outer diameter at least 0.5 inch larger than the diameter of the cutting portion and no greater than 1 inch larger than the diameter of the cutting portion.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
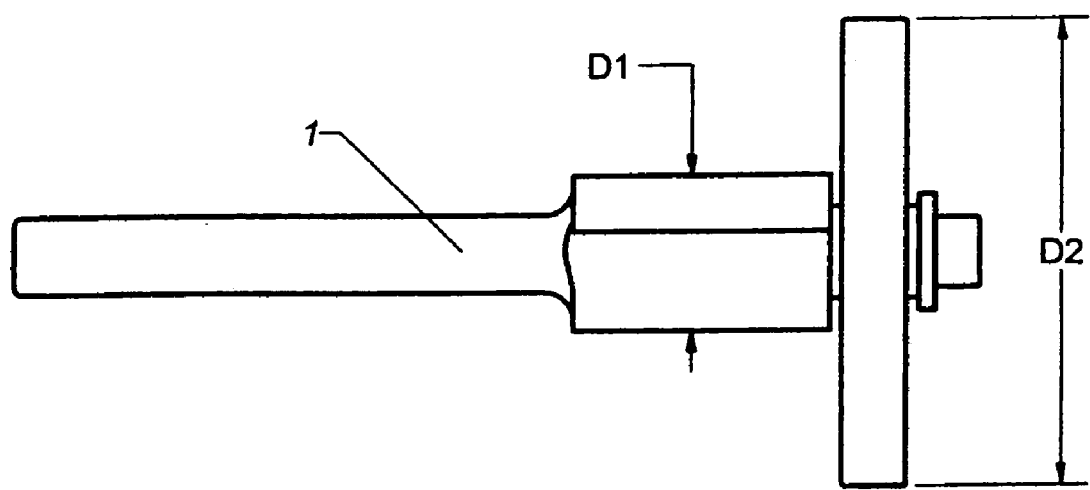
FIG. 1 shows a front elevation view of the rotary cutting tool.
Figure 2:
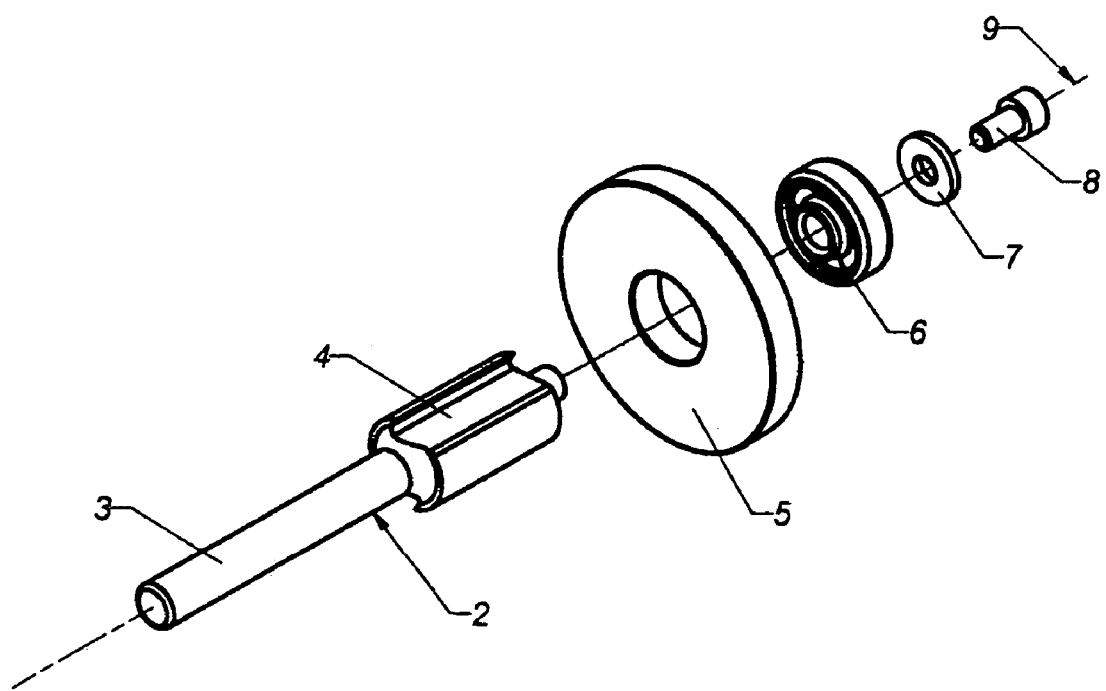
FIG. 2 shows an explode view of the rotary cutting tool of FIG. 1.

FIG. 1 shows a rotary cutting tool 1 according to the present invention. FIG. 2 shows the component parts of the rotary cutting tool, beginning with the router bit 2. Router bit 2 is comprised of a shank portion 3 integrally formed with a cutting portion 4. The shank portion 3 and cutting portion 4 are coaxial with one another along axis 9. The bearing 6 is attached to the bottom of the cutting portion 4 by means of a screw 8 and washer 7. The bearing 6 is also coaxial along axis 9. While the preferred embodiment shows a ball bearing assembly, other bearing means, such as a bushing made of a friction reducing material, may be used in place of the ball bearing. Similarly, the preferred embodiment shows a screw 8 being used to attach the bearing 6 to the cutting portion 4. Other attachment means may be used, such as a threaded projecting (not shown) extending from the bottom of the cutting portion 4. A nut is then screwed onto the threaded projection, holding the bearing in place. It should be understood by one knowledgeable in the art that all such embodiments of the bearing and attachment means are within the scope of the claims. The rub collar 5 has an inner diameter and an outer diameter. The inner diameter is substantially the same as the outer diameter of bearing 6. This allows the bearing 6 to be press fit into the rub collar 5. Due to the fine particles of dust formed during the cutting operation, combined with the high rotating speed of the router bit 2, the bearing 6 will from time to time require replacement. The preferred embodiment of the present design allows removal of the bearing 6 from the rub collar 5 by exerting force upon it so that it slips out of the rub collar 5. In another embodiment, the bearing 6 can be permanently mounted in the rub collar 5, for example by use of an adhesive or the use of small welds at the interface of the outer diameter of the bearing 6 and the inner diameter of the rub collar 5. Preferably, the rub collar 5 is made of aluminum to facilitate the press fitting of the bearing 6, although any rigid material may be used and remain within the scope of the claims.

Figure 3:
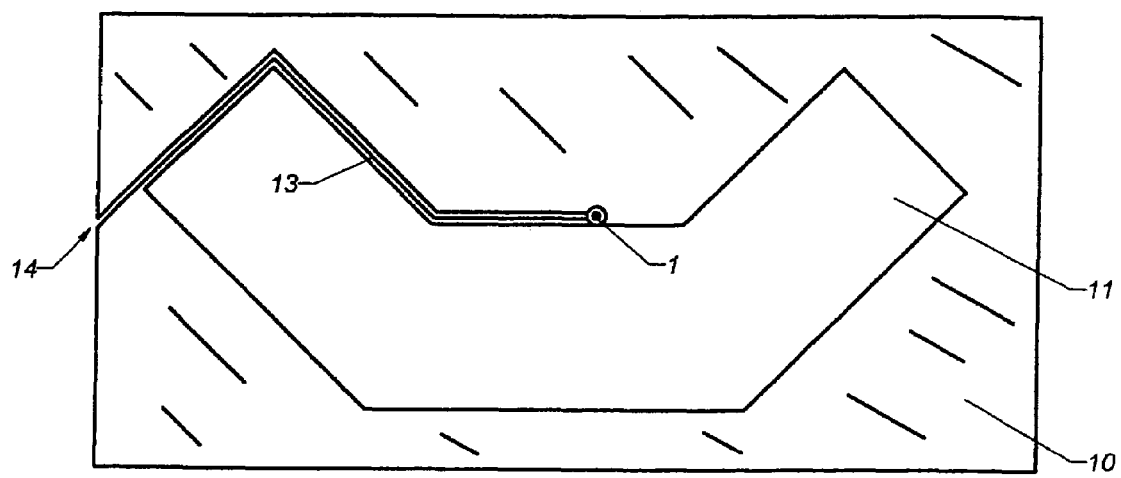
FIG. 3 shows a diagrammatic view of the rotary cutting tool in use cutting a workpiece to size for a counter top.

FIG. 3 shows diagrammatically the operation of the present invention to cut out a predetermined shape from workpiece 10 for covering the surface of a substrate 11. This figure shows the relationship of the rotary cutting tool 1 to the substrate 11 from the underside of the substrate 11 as the cutting operation is proceeding. The cutting operation results in the workpiece 10 being larger than the substrate 11 by substantially the same amount on all sides. This larger dimension is shown in FIG. 3 as the strip 13 of the workpiece extending beyond the edges of the substrate 11.

Figure 4:
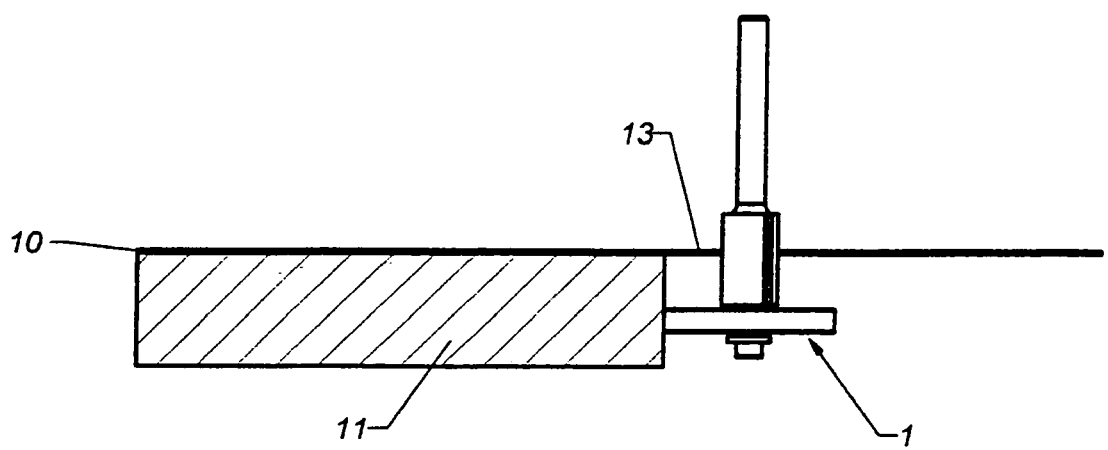
FIG. 4 is a detail diagrammatic view of the rotary cutting tool in use as in FIG. 3.
Figure 5:
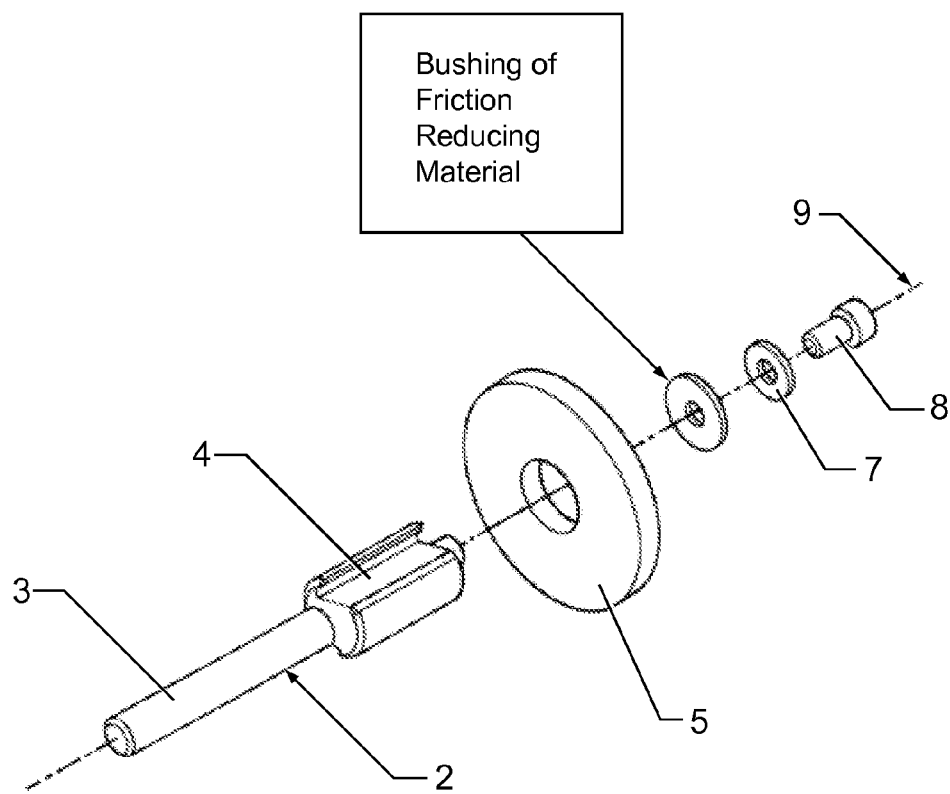
FIG. 5 shows an exploded view of the rotary cutting tool with the location of a bushing of friction reducing material being schematically indicated.

Similarly, FIG. 4 shows diagrammatically the operation of the present invention from a side view. The rotary cutting tool 1 is used to cut the workpiece 10 so that it is larger than the substrate 11.

FIG. 3 shows a substrate 11 with a typical complex shape to be covered by the workpiece 10. The substrate 11 is typically a counter top found in the kitchen of a house. The substrate 11 may also be the top of a table or desk, a bookcase, shelves, or nearly any other piece of furniture. The workpiece 10 is typically a decorative plastic laminate, although other materials such as wood veneer could be used with the present invention. The workpiece 10 typically comes in sheets much larger than the surface to be covered. Thus, the workpiece 10 must be cut to size. For simple shapes such as rectangles, the process is straightforward. However, for a complex shape such as that shown by the substrate 11 in FIG. 3, a substantial amount of skill and time is required to cut the workpiece 10 to the proper size. One such method is to clamp the workpiece 10 onto the substrate 11. A pencil is then used to trace the shape or pattern of the substrate 11 onto the back of the workpiece 10. The workpiece 10 is then removed and the shape is cut out of the workpiece 10 using a saw, laminate cutting knife, circular saw, or router. Both the top surface of the substrate 11 and the back side of the workpiece 10 are coated with an adhesive. If the workpiece 10 is cut to the exact size of the substrate 11, then extreme care must be taken when placing the workpiece 10 on the substrate 11. Once the two adhesive-coated surfaces touch, no further movement of the workpiece 10 relative to the substrate 11 can be made because of the adhesive. Thus, if the workpiece 10 is misaligned, it cannot be slid into place and the substrate 11 and workpiece 10 may be ruined. Alternatively, the workpiece 10 can be cut to slightly larger dimensions than the pattern scribed onto it. This eliminates the need for exact placement of the workpiece onto the substrate after application of the adhesive, but requires more labor to trace a larger pattern before cutting.

By using the present invention, no special skills are required to cut the pattern of the substrate 11 out of the workpiece 10. The workpiece 10 is first attached to the substrate by means of removable clamps. The rotary cutting tool 1 is placed in a rotating means such as a router machine. Beginning at one edge 14 of the workpiece, the rotary cutting tool 1 is allowed to cut into the workpiece 11 until the rub collar 5 comes into contact with one of the side surfaces of the substrate 11. The rotary cutting tool 1 is passed around the side surfaces of the substrate 11 keeping the rub collar 5 in continuous contact with the side surface of the substrate 11. In this manner, the workpiece 10 is cut to a larger dimension than the substrate 11. The amount that the dimensions of workpiece 10 exceed the dimensions of the substrate 11 are dictated by the diameter of the rub collar 5 relative to the diameter of the cutting portion 4 of the router bit 2. As shown in FIG. 1, the diameter of the cutting portion 4 of the router bit 2 is represented by D1. Similarly, the diameter of the rub collar 5 is represented by D2. One-half of the difference between D2 and D1 defines the amount that the dimensions of the workpiece 10 exceed the dimensions of the substrate 11. In the preferred embodiment, D2 exceeds D1 by at least 0.5 inch and no more than 1 inch. Experimentation has shown that a minimum difference of 0.5 inch between D2 and D1 is required to minimize the amount of skill necessary to adequately position the workpiece 10 onto the substrate 11 after application of the adhesive. Experimentation has also shown that limiting the maximum difference between D2 and D1 to 1 inch minimizes the amount of vibration of the workpiece 10 during the cutting operation. In other embodiments, the smallest difference between D2 and D1 is 0.375 inch. Half this difference, or 0.1875 inch, corresponds to one of the typical thicknesses of decorative plastic laminate. Since the decorative plastic laminate covers the side of the substrate 11, the amount the dimensions of the workpiece 10 exceed the dimensions of the substrate 11 must be greater than 0.1875 inch. In still other embodiments, it was found that a maximum difference between D2 and D1 of 1.5 inches could be maintained, although somewhat more skill was required for the cutting operation.

It is understood that the embodiments described herein are intended to serve as illustrative examples of certain embodiments of the present invention. Other arrangements, variations, and modifications of the above may be made by those skilled in the art. No unnecessary limitations are to be understood from this disclosure, and any such arrangements, variations, and modifications may be made without departing from the spirit of the invention and scope of the appended claims.

We claim:

1. A rotary cutting tool for cutting a workpiece such that the dimensions of the workpiece are larger than a substrate to which the workpiece is mounted, comprising:
   a. a shank portion adapted to be removably retained by a rotating means;
   b. a cutting portion having a first and second end, wherein the first end is attached to the shank portion below that part of the shank portion adapted for removably retaining by the rotating means, such that the shank portion and cutting portion are coaxial to one another;
   c. a bearing connected to the second end of the cutting portion, such that the axis of rotation of the bearing is coaxial with the axis of rotation of the cutting portion; and
   d. a circular rub collar connected to the peripheral edge of the bearing so that the bearing and rub collar are coaxial and have a common center point, an outer diameter of the rub collar about 0.5 to about 1.0 inch greater than a largest diameter of the cutting portion.

2. The rotary cutting tool of claim 1 wherein the bearing is a ball bearing.

3. The rotary cutting tool of claim 1 wherein the bearing is a bushing of reduced friction material.

* * * * *